US005280299A

United States Patent [19]

Saikawa et al.

[11] Patent Number: 5,280,299

[45] Date of Patent: Jan. 18, 1994

[54] INK FILLING METHOD FOR INK JET RECORDING APPARATUS

[75] Inventors: Hideo Saikawa, Kawasaki; Seiichiro Karita, Yokohama; Toshio Kashino, Chigasaki; Akio Saito, Hadano; Hiroshi Nakagomi, Yamato; Teruo Arashima, Yokohama; Makiko Kimura, Sagamihara; Hiroshi Sugitani, Machida; Yoshifumi Hattori, Yamato; Masami Ikeda, Tokyo; Masaaki Izumida; Shigeaki Tanaka, both of Kawasaki; Nobuyuki Kuwabara, Tokyo; Asao Saito, Yokohama; Kazuaki Masuda, Sagamihara; Tsuyoshi Orikasa, Kasukabe, all of Japan

[73] Assignee: Canon Kabushiki Kaisha, Tokyo, Japan

[21] Appl. No.: 719,151

[22] Filed: Jun. 21, 1991

Related U.S. Application Data

[62] Division of Ser. No. 583,136, Sep. 17, 1990.

[30] Foreign Application Priority Data

| | | | |
|---|---|---|---|
| Sep. 18, 1989 | [JP] | Japan | 1-241043 |
| Sep. 18, 1989 | [JP] | Japan | 1-241044 |
| Feb. 28, 1990 | [JP] | Japan | 1-048177 |

[51] Int. Cl.[5] ........................ G01D 9/00; G01D 15/18

[52] U.S. Cl. ................................ 346/1.1; 346/140 R

[58] Field of Search ...................... 346/1.1, 140; 141/1, 141/18; 137/1

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,600,927 | 7/1986 | Sugitani | 346/1.1 |
| 4,689,642 | 8/1987 | Sugitani | 346/140 R |
| 4,723,129 | 2/1988 | Endo et al. | 346/1.1 |
| 4,740,796 | 4/1988 | Endo et al. | 346/1.1 |
| 4,929,969 | 5/1990 | Morris | 346/140 R |
| 4,968,998 | 11/1990 | Allen | 346/140 R |
| 4,998,115 | 3/1991 | Nevarez et al. | 346/1.1 |
| 5,051,759 | 9/1991 | Karita et al. | 346/140 R |
| 5,055,861 | 10/1991 | Murayama et al. | 346/140 R |
| 5,113,206 | 5/1992 | Fukazawa | 346/140 R |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

An ink jet head cartridge include an ink container and a porous material contained in the container for retaining the ink. A process for filling the ink container includes the steps of supplying ink in a quantity greater than that which the porous material can retain through a first port and removing through a second port at least a quantity of ink which the porous material cannot retain. The process can also be performed through a single port. At least one of the ports can also be used for communicating with a recording head portion of the cartridge.

4 Claims, 9 Drawing Sheets

INK FILLING METHOD FOR INK JET RECORDING APPARATUS

This application is a division of application Ser. No. 07/583,136 filed Sep. 17, 1990.

FIELD OF THE INVENTION AND RELATED ART

The present invention relates to an ink jet recording head and an ink jet recording apparatus provided with an ink container having therein an ink absorbing porous material.

An ink jet head is known which comprises an integral energy generating portion for producing recording droplets and an ink container for supplying the ink thereto. The ink container of the ink jet head of this type generally includes therein a compressed porous material which is impregnated with the ink. The ink retained in the porous material is discharged to an ink ejecting portion through a common chamber by a capillary action in accordance with consumption of the ink by the ejecting portion. In addition, in order to prevent production of vacuum pressure in the ink container, a small area of the ink container (approximately 3% of the inside area of the ink container) is opened to the atmosphere (air vent).

In this conventional structure, the porous material occupies an increasing percentage of the volume of the ink container, since the demand is for the larger quantity of the ink contained in the recording head to reduce the frequency of exchanging it. However, on the contrary to the increase of the quantity of the ink therein, the quantity of the ink not usable and remaining in the container is increasing.

It is important that the ink is retained in the porous material in the manner that the ejection properties are not influenced.

An ink supply pipe pressed to the porous material in the ink container and supplies to an ink chamber communicating with the ink ejection passage. The pressure is effective to stabilize the contact with the porous material by deforming the porous material contacted by the pipe. The degree of pressure is small from the standpoint of not largely deforming the porous material. However, with the performance of the recording operation, the ink supply sometimes becomes not enough despite a large quantity of the ink remaining in the container with the result of forced exchange of the ink jet recording head or cartridge.

This tendency has been more remarkable in the case wherein a rib or ribs are formed in the container adjacent the air vent opening.

SUMMARY OF THE INVENTION

Accordingly, it is a principal object of the present invention to provide an ink jet recording head or cartridge and a recording apparatus having the same wherein the quantity of the ink non-consumably remaining in the container is reduced.

It is another object of the present invention to provide an ink jet recording head or cartridge and an ink jet recording apparatus having the same wherein the exchange frequency of the ink jet recording head or cartridge is reduced.

It is a further object of the present invention to provide an ink jet head or cartridge and an ink jet recording apparatus using the same wherein the recording operation can be performed in a stabilized manner.

It is a further object of the present invention to provide an ink jet head or a cartridge and an ink jet recording apparatus having the same wherein the consumption of the ink in the ink container is improved.

It is a further object of the present invention to provide an ink jet head or cartridge and an ink jet recording apparatus having the same wherein the quantity of the non-consumably remaining ink in the ink container is significantly reduced.

It is a further object of the present invention to provide an ink jet head or cartridge and an ink jet recording apparatus wherein the ink in the ink container can be efficiently consumed.

It is a further object of the present invention to provide an ink jet head or cartridge and an ink jet recording apparatus wherein the ink can be supplied without adverse influence to the ink ejection property.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

FIGS. 2, 3, 4, 5 and 6 illustrate an ink jet unit IJU, an ink jet heat IJH, an ink container IT, an ink jet cartridge IJC, a head carriage HC and a main assembly IJRA of an ink jet recording apparatus, according to an embodiment of the present invention, and relations among them. The structures of the respective elements will be described in the following.

Figure 2:
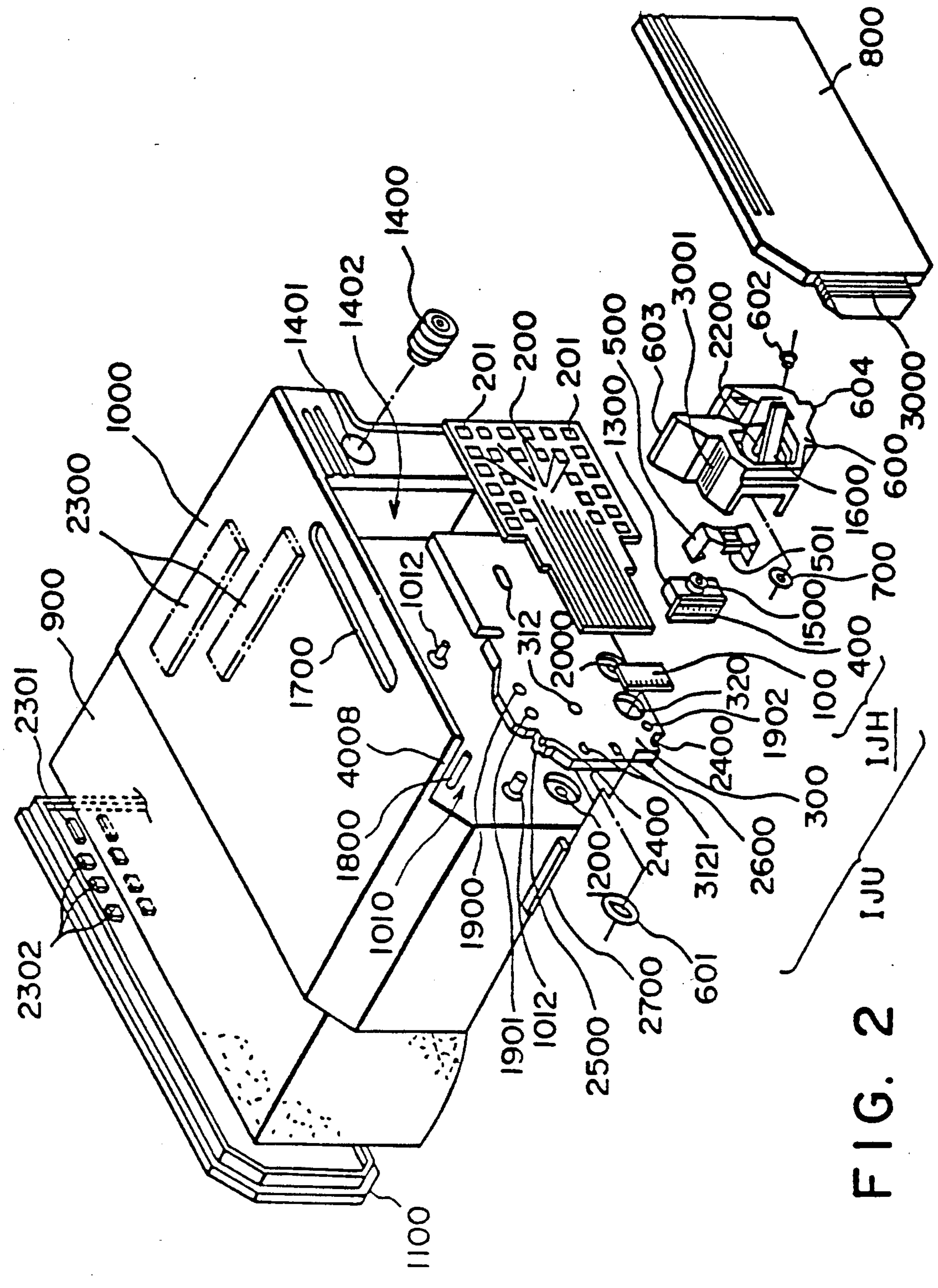
FIG. 2 is an exploded perspective view of an ink jet cartridge according to an embodiment of the present invention.
Figure 3:
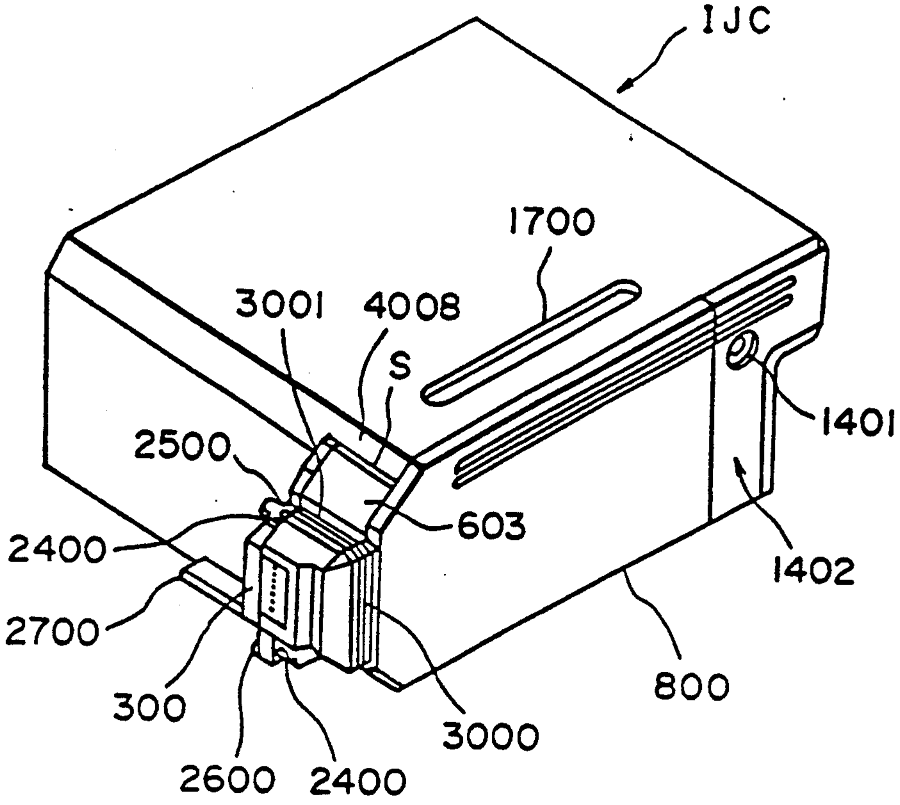
FIG. 3 is an assembled perspective view of the cartridge of FIG. 2.

As will be understood from the perspective view of FIG. 3, the ink jet cartridge IJC in this embodiment has a relatively large ink accommodation space, and an end portion of the ink jet unit IJU is slightly projected from the front side surface of the ink container IT. The ink jet cartridge IJC is mountable at correct position on the carriage HC (FIG. 5) of the ink jet recording apparatus main assembly IJRA by proper positioning means and with electric contacts, which will be described in detail hereinafter. It is, in this embodiment, a disposable type head detachably mountable on the carriage AC. The structures disclosed in FIGS. 2-6 contain various novel features, which will first be described generally.

(i) Ink Jet Unit IJU

The ink jet unit IJU is of a bubble jet recording type using electrothermal transducers which generate thermal energy, in response to electric signals, to produce film boiling of the ink.

Referring to FIG. 2, the unit comprises a heater board 100 having electrothermal transducers (ejection heaters) arranged in a line on an Si substrate and electric lead lines made of aluminum or the like to supply electric power thereto. The electrothermal transducer and the electric leads are formed by a film forming process. A wiring board 200 is associated with the heater board 100 and includes wiring corresponding to the wiring of the heater board 100 (connected by the wire bonding technique, for example) and pads 201 disposed at an end of the wiring to receive electric signals from the main assembly of the recording apparatus.

A top plate 1300 is provided with grooves which define partition walls for separating adjacent ink passages and a common liquid chamber for accommodating the ink to be supplied to the respective ink passages. The top plate 1300 is formed integrally with an ink jet opening 1500 for receiving the ink supplied from the ink container IT and directing the ink to the common chamber, and also with an orifice plate 400 having the plurality of ejection outlets corresponding to the ink passages. The material of the integral mold is preferably polysulfone, but may be another molding resin material.

A supporting member 300 is made of metal, for example, and functions to support a backside of the wiring board 200 in a plane, and constitutes a bottom plate of the ink jet unit IJU. A confining spring 500 is in the form of "M" having a central portion urging to the common chamber with a light pressure, and a clamp 501 urges concentratedly with a line pressure to a part of the liquid passage, preferably the part in the neighborhood of the ejection outlets. The confining spring 500 ha legs for clamping the heater board 100 and the top plate 1300 by penetrating through the openings 3121 of the supporting plate 300 and engaging the back surface of the supporting plate 300. Thus, the heater board 100 and the top plate 1300 are clamped by the concentrated urging force by the legs and the clamp 501 of the spring 500. The supporting plate 300 has positioning openings 312, 1900 and 2000 engageable with two positioning projections 1012 and positioning and fuse-fixing projections 1800 and 1801 of the ink container IT. It further includes projections 2500 and 2600 at its backside for the positioning relative to the carriage HC of the main assembly IJRA.

In addition, the supporting member 300 has a hole 320 through which an ink supply pipe 2200, which will be described hereinafter, is penetrated for supplying ink from the ink container. The wiring board 200 is mounted on the supporting member 300 by bonding agent or the like. The supporting member 300 is provided with recesses 2400 and 2400 adjacent the positioning projections 2500 and 2600.

Figure 5:
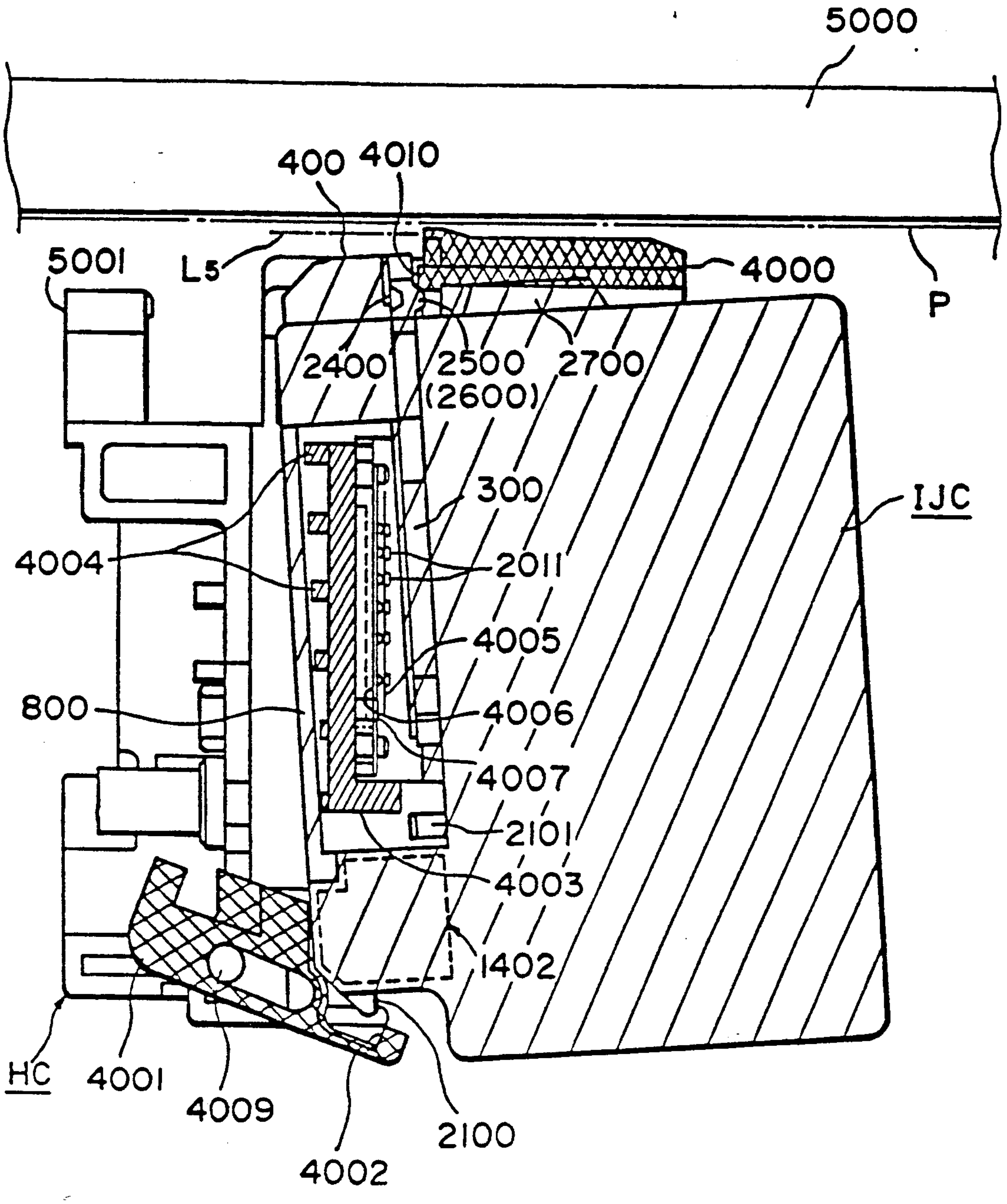
FIG. 5 illustrates the mounting of the cartridge IJC to an ink jet recording apparatus.

As shown in FIG. 3, the assembled ink jet cartridge IJC has a head projected portion having three sides provided with plural parallel grooves 3000 and 3001. The recesses 2400 and 2400 are located at extensions of the parallel grooves at the top and bottom sides to prevent the ink or foreign matter moving along the groove from reaching the projections 2500 and 2600. The covering member 800 having the parallel grooves 3000, as shown in FIG. 5, constitutes an outer casing of the ink jet cartridge IJC and cooperates with the ink container to define a space for accommodating the ink jet unit IJU. The ink supply member 600 having the parallel groove 3001 has an ink conduit pipe 1600 communicating with the above-described ink supply pipe 2200 and cantilevered at the supply pipe 2200 side. In order to assure the capillary action at the fixed side of the ink conduit pipe 1600 and the ink supply pipe 2200, a sealing pin 602 is inserted.

A gasket 601 seals the connecting portion between the ink container IT and the supply pipe 2200. A filter 700 is disposed at the container side end of the supply pipe. The ink supply member 600 is molded, and therefore, it is produced at low cost with high positional accuracy. In addition, the cantilevered structure of the conduit 1600 assures the press-contact between the conduit 1600 and the ink inlet 1500 even if the ink supply member 600 is mass-produced.

In this embodiment, the complete communicating state can be assuredly obtained simply by flowing sealing bonding agent from the ink supply member side under the press-contact state. The ink supply member 600 ma be fixed to the supporting member 300 by inserting and penetrating backside pins (not shown) of the ink supply member 600 through the openings 1901 and 1902 of the supporting member 300 and by heat-fusing the portion where the pins are projected through the backside of the supporting member 300. The slight projected portions thus heat-fused are accommodated in recesses (not shown) in the ink jet unit (IJU) mounting side surface of the ink container IT, and therefore, the unit IJU can be correctly positioned.

(ii) Ink Container IT

The ink container comprises a main body 1000, an ink absorbing material and a cover member 1100. The ink absorbing material 900 is inserted into the main body 1000 from the side opposite from the unit (IJU) mounting side, and thereafter, the cover member 1100 seals the main body.

The ink absorbing material 900 is thus disposed in the main body 1000. The ink supply port 1200 functions to supply the ink to the ink jet unit IJU comprising the above-described parts 100-600, and also functions as an ink injection inlet to permit initial ink supply to the absorbing material 900 before the unit IJU is mounted to the portion 1010 of the main body.

In this embodiment, the ink may be supplied through an air vent port and this supply opening. In order to ensure good supply of ink, ribs 2300 are formed on the inside surface of the main body 1000, and ribs 2301 and 2302 are formed on the inside of the cover member 1100, which are effective to provide within the ink container an ink existing region extending continuously from the air vent port side to that corner portion of the main body which is most remote from the ink supply opening 1200. Therefore, in order to uniformly distribute the ink in good order, it is preferable that the ink is supplied through the supply opening 1200. This ink supply method is practically effective. The number of the ribs 2300 in this embodiment is four, and the ribs 2300 extend parallel to a movement direction of the carriage adjacent the rear side of the main body of the ink container, by which the absorbing material 900 is prevented from closely contacting to the inner surface of the rear side of the main body. The ribs 2301 and 2302 are formed on the inside surface of the cover member 1100 at a position which is substantially an extension of the ribs 2300, however, as contrasted to the large rib 2300, the size of the ribs 2301 and 2302 are small as if it is divided ribs, so that the air existing space is larger with the ribs 2301 and 2302 than with the rib 2300. The ribs 2302 and 2301 are distributed on the entire area of the cover member 1100, and the area thereof is not more than one half of the total area. Because of the provisions of the ribs, the ink in the corner region of the ink absorbing material which is most remote from the supply opening 1200 can be stably and assuredly supplied to the inlet opening by capillary action. The cartridge is provided with an air vent port for communication between the inside of the cartridge with the outside air. Inside the vent port 1400, there is a water repellent material 1400 to prevent the inside ink from leaking outside through the vent port 1400.

The ink accommodating space in the ink container IT is substantially rectangular parallelepiped, and the long side faces in the direction of carriage movement, and therefore, the above-described rib arrangements are particularly effective. When the long side extends along the movement direction of the carriage, or when the ink containing space is in the form of a cube, the ribs are preferably formed on the entire surface of the inside of the cover member 1100 to stabilize the ink supply from the ink absorbing material 900. The cube configuration is preferable from the standpoint of accommodating as much ink as possible ink in limited space. However, from the standpoint of using the ink with minimum an available part in the ink container, the provisions of the ribs formed on the two surfaces constituting a corner.

In this embodiment, the inside ribs 2301 and 2302 of the ink container IT are substantially uniformly distributed in the direction of the thickness of the ink absorbing material having the rectangular parallelepiped configuration. Such a structure is significant, since the air pressure distribution in the ink container IT is made uniform when the ink in the absorbing material is consumed so that the quantity of the remaining unavailable ink is substantially zero. It is preferable that the ribs are disposed on the surface or surfaces outside a circular arc having the center at the projected position on the ink supply opening 1200 on the top surface of the rectangular ink absorbing material and having a radius which is equal to the long side of the rectangular shape, since then the ambient air pressure is quickly established for the ink absorbing material present outside the circular arc. The position of the air vent of the ink container IT is not limited to the position of this embodiment if it is good for introducing the ambient air into the position where the ribs are disposed.

In this embodiment, the backside of the ink jet cartridge IJC is flat, and therefore, the space required when mounted in the apparatus is minimized, while maintaining the maximum ink accommodating capacity. Therefore, the size of the apparatus can be reduced, and simultaneously, the frequency of the cartridge exchange is minimized. Utilizing the rear space of the space used for unifying the ink jet unit IJU, a projection for the air vent port 1401 is provided. The inside of the projection is substantially vacant, and the vacant space 1402 functions to supply the air into the ink container IT uniformly in the direction of the thickness of the absorbing material. Because of these features described above, the cartridge as a whole is of better performance than the conventional cartridge. The air supply space 1402 is much larger than that in the conventional cartridge. In addition, the air vent port 1401 is at an upper position, and therefore, if the ink departs from the absorbing material for some reason or another, the air supply space 1402 can temporarily retain the ink to permit such ink to be absorbed back into the absorbing material. Therefore, the wasteful consumption of the ink can be saved.

Figure 4:
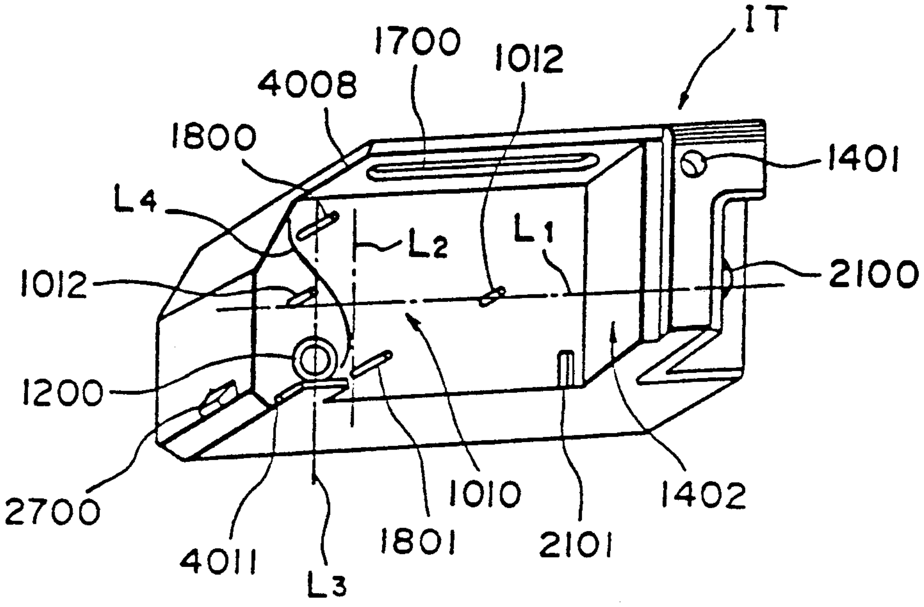
FIG. 4 is a perspective view of a mounting portion for mounting the ink jet unit IJU.

Referring to FIG. 4, there is shown a structure of a surface of the ink container IT to which the unit IJU is mounted. Two positioning projections 1012 are on a line L1 which is a line passing through the substantial center of the array of the ejection outlets in the orifice plate 400 and parallel with the bottom surface of the ink container IT or the parallel to the ink container supporting reference surface of the carriage. The height of the projections 1012 is slightly smaller than the thickness of the supporting member 300, and the projections 1012 function to correctly position the supporting member 300. On an extension (right side) in this Figure, there is a pawl 2100 with which a right angle engaging surface 4002 of a carriage positioning hook 4001 is engageable. Therefore, the force for the positioning of the ink jet unit relative to the carriage acts in a plane parallel to a reference plane including the line L1. These relationships are significant, since the accuracy of the ink container positioning becomes equivalent to the positioning accuracy of the ejection outlet of the recording head, which will be described hereinafter in conjunction with FIG. 5.

Projections 1800 and 1801 corresponding to the fixing holes 1900 and 2000 for fixing the supporting member 300 to the side of the ink container IT, are longer than the projections 1012, so that they penetrate through the supporting member 300, and the projected portions are fused to fix the supporting member 300 to the side surface. When a line L3 passing through the projection 1800 and perpendicular to the line L1, and a line L2 passing through the projection 1801 and perpendicular to the line L1, are drawn. The center of the supply opening 1200 is substantially on the line L3, the connection between the supply opening 1200 and a supply type 2200 is stabilized, and therefore, even if the cartridge falls, or even if a shock is imparted to the cartridge, the force applied to the connecting portion can be minimized. In addition, since the lines L2 and L3 are not overlapped, and since the projections 1800 and 1801 are disposed adjacent to that projection 1012 which is nearer to the ink ejection outlets of the ink jet head, the positioning of the ink jet unit relative to the ink container is further improved. In this Figure, a curve L4 indicates the position of the outer wall of the ink supply member 600 when it is mounted. Since the projections 1800 and 1801 are along the curve L4, the projections are effective to provide sufficient mechanical strength and positional accuracy against the weight of the end structure of the head IJH.

An end projection 2700 of the ink container IT is engageable with a hole formed in the front plate 4000 of the carriage to prevent the ink cartridge from being displaced extremely out of the position. A stopper 2101 is engageable with an unshown rod of the carriage HC, and when the cartridge IJC is correctly mounted with rotation, which will be described hereinafter, the stopper 2101 take a position below the rod, so that even if an upward force tending to disengage the cartridge from the correct position is unnecessarily applied, the correct mounted state is maintained. The ink container IT is covered with a cover 800 after the unit IJU is mounted thereto. Then, the unit IJU is enclosed therearound except for the bottom thereof. However, the bottom opening thereof permits the cartridge IJC to be mounted o the carriage HC, and is close to the carriage HC, and therefore, the ink jet unit is substantially enclosed at the six sides. Therefore, the heat generation from the ink jet head IJH which is in the enclosed space is effective to maintain the temperature of the enclosed space.

However, if the cartridge IJC is continuously operated for a long period of time, the temperature slightly increases. Against the temperature increase, the top surface of the cartridge IJC is provided with a slit 1700 having a width smaller than the enclosed space, by which the spontaneous heat radiation is enhanced to prevent the temperature rise, while the uniform temperature distribution of the entire unit IJU is not influenced by the ambient conditions.

After the ink jet cartridge IJC is assembled, the ink is supplied from the inside of the cartridge to the chamber in the ink supply member 600 through a supply opening 1200, the whole 320 of the supporting member 300 and an inlet formed in the backside of the ink supply member 600. From the chamber of the ink supply member 600, the ink is supplied to the common chamber through the outlet, supply pipe and an ink inlet 1500 formed in the top plate 1300. The connecting portion for the ink communication is sealed by silicone rubber or butyl rubber or the like to assure the hermetical seal.

In this embodiment, the top plate 1300 is made of resin material having resistivity to the ink, such as polysulfone, polyether sulfone, polyphenylene oxide, polypropylene. It is integrally molded in a mold together with an orifice plate portion 400.

As described in the foregoing, the integral part comprises the ink supply member 600, the top plate 1300, the orifice plate 400 and parts integral therewith, and the ink container body 1000. Therefore, the accuracy in the assembling is improved, and is convenient in the mass-production. The number of parts is smaller than a conventional device, so that the good performance can be assured.

In this embodiment, as shown in FIGS. 2–4, the configuration after assembly is such that the top portion 603 of the ink supply member 600 cooperates with an end of the top thereof having the slits 1700, so as to form a slit S, as shown in FIG. 3. The bottom portion 604 cooperates with feed side end 4011 of a thin plate to which the bottom cover 800 of the ink container IT is bonded, so as to form a slit (not shown) similar to the slit S. The slits between the ink container IT and the ink supply member 600 are effective to enhance the heat radiation, and is also effective to prevent an expected pressure to the ink container IT from influencing directly the supply member or to the ink jet unit IJT.

The above-described various structures are individually effective to provide the respective advantages, and also they are most effective when they are combined each other.

(iii) Mounting of the Ink Jet Cartridge IJC to the Carriage HC

In FIG. 5, a platen roller 5000 guides the recording medium from the bottom to the top. The carriage HC is movable along the platen roller 5000. The carriage HC comprises a front plate 4000, a supporting plate 4003 for electric connection and a positioning hook 4001. The front plate 400 has a thickness of 2 mm, and is disposed closer to the platen. The front plate 4000 is disposed close to the front side of the ink jet cartridge IJC, when the cartridge IJC is mounted to the carriage. The supporting plate 4003 supports a flexible sheet 4005 having pads 2011 corresponding to the pads 201 of the wiring board 200 of the ink jet cartridge IJC and a rubber pad sheet 4007 for producing elastic force for urging the backside of the flexible sheet 4005 to the pads 2001. The positioning hook 4001 functions to fix the ink jet cartridge IJ to the recording position. The front plate 4000 is provided with two positioning projection surfaces 4010 corresponding to the positioning projections 2500 and 2600 of the supporting member 300 of the cartridge described hereinbefore. After the cartridge is mounted, the front plate receives the force in the direction perpendicular to the projection surfaces 4010. Therefore, plural reinforcing ribs (not shown) are extended in the direction of the force at the platen roller side of the front plate. The ribs project toward the platen roller slightly (approximately 0.1 mm) from the front side surface position L5 when the cartridge IJC is mounted, and therefore, they function as head protecting projections. The supporting plate 4003 is provided with plural reinforcing ribs 4004 extending in a direction perpendicular to the above-described front plate ribs. The reinforcing ribs 4004 have heights which decrease from the plate roller side to the hook 4001 side. By this, the cartridge is inclined as shown in FIG. 5, when it is mounted.

The supporting plate 4003 is provided with two additional positioning surfaces 4006 at the lower left portion, that is, at the position closer to the hook. The positioning surfaces 4006 correspond to projection surfaces 4010 by the additional positioning surfaces 4006, the cartridge receives the force in the direction opposite from the force received by the cartridge by the above-described positioning projection surfaces 4010, so that the electric contacts are stabilized. Between the upper and lower projection surfaces 4010, there is disposed a pad contact zone, so that the amount of deformation of the projections of the rubber sheet 4007 corresponding to the pad 2011 is determined. When the cartridge IJC is fixed at the recording position, the positioning surfaces are brought into contact with the surface of the supporting member 300. In this embodiment, the pads 201 of the supporting member 300 are distributed so that they are symmetrical with respect to the above-described line L1, and therefore, the amount of deformation of the respective projections of the rubber sheet 4007 are made uniform to stabilize the contact pressure of the pads 2011 and 201. In this embodiment, the pads 201 are arranged in two columns and upper and bottom two rows.

The hook 4001 is provided with an elongated hole engageable with a fixed pin 4009. Using the movable range provided by the elongated hole, the hook 4001 rotates in the counterclockwise direction, and thereafter, it moves leftwardly along the platen roller 5000, by which the ink jet cartridge IJC is positioned to the carriage HC. Such a movable mechanism of the hook 4001 may be accomplished by another structure, but it is preferable to use a lever or the like. During the rotation of the hook 4001, the cartridge IJC moves from the position shown in FIG. 5 to the position toward the platen side, and the positioning projections 2500 and 2600 come to the position where they are engageable to the positioning surfaces 4010. Then, the hook 4001 is moved leftwardly, so that the hook surface 4002 is contacted to the pawl 2100 of the cartridge IJC, and the ink cartridge IJC rotates about the contact between the positioning surface 2500 and the positioning projection 4010 in a horizontal plane, so that the pads 201 and 2011 are contacted to each other. When the hook 4001 is locked, that is retained at the fixing or locking position, by which the complete contacts are simultaneously established between the pads 201 and 2011, between the positioning portions 2500 and 4010, between the standing surface 4002 and the standing surface of the pawl and between the supporting member 300 and the positioning surface 4006, and therefore, the cartridge IJC is completely mounted on the carriage.

(iv) General Arrangement of the Apparatus

Figure 6:
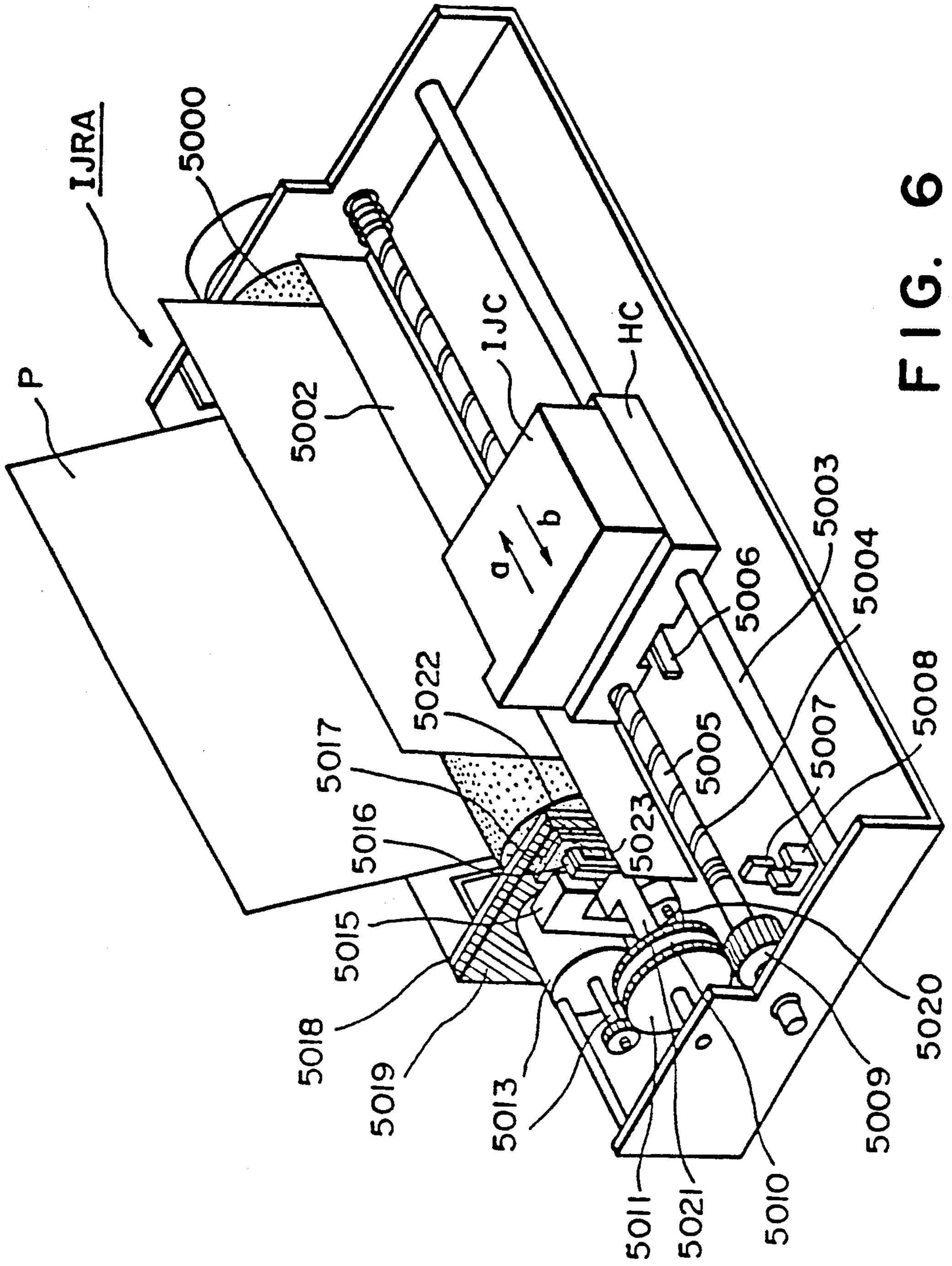
FIG. 6 is a perspective view of a printing apparatus according to the present invention.

FIG. 6 is a perspective view of an ink jet recording apparatus IJRA in which the present invention is used. A lead screw 5005 rotates by way of a drive transmission gears 5011 and 5009 by the forward and backward rotation of a driving motor 5013. The lead screw 5005 has a helical groove 5004 with which a pin (not shown) of the carriage HC is engaged, by which the carriage HC is reciprocable in directions a and b. A sheet confining plate 5002 confines the sheet on the platen over the carriage movement range. Home position detecting means 5007 and 5008 are in the form of a photocoupler to detect presence of a lever 5006 of the carriage, in response to which the rotational direction of the motor 5013 is switched. A supporting member 5016 supports the front side surface of the recording head to a capping member 5022 for capping the recording head. Sucking means 5015 functions to suck the recording head through the opening 5023 of the cap so as to recover the recording head.

A cleaning blade 5017 is moved toward front and rear by a moving member 5019. They are supported on the supporting frame 5018 of the main assembly of the apparatus. The blade may be in another form, more particularly, a known cleaning blade. A lever 5021 is effective to start the sucking recovery operation and is moved with the movement of a cam 5020 engaging the carriage, and the driving force from the driving motor is controlled by known transmitting means such as clutch or the like.

The capping, cleaning and sucking operations can be performed when the carriage is at the home position by the lead screw 5005, in this embodiment. However, the present invention is usable in another type of system wherein such operations are effected at different timing. The individual structures are advantageous, and in addition, the combination thereof is further preferable.

Figure 1:
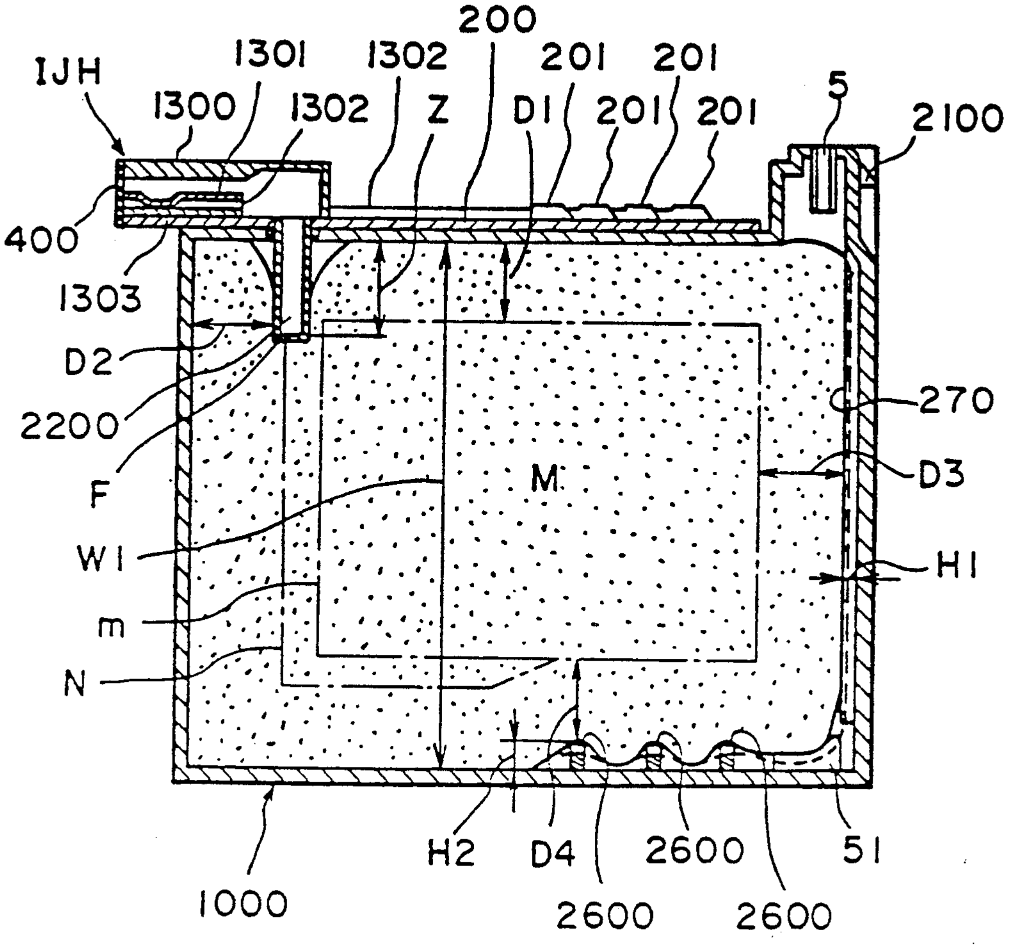
FIG. 1 illustrates an embodiment of the present invention.

Referring now to FIG. 1, the ribs 270 and 2600 in the ink container function to guide the air from the vent port 5 into the inside of the container to form an air existing space 51 to improve the ink supply property. The ribs 270 extend vertically on the Figure, and the ribs 2600 are divided into plural sections to provide a space therebetween. Therefore, the porous material (urethane sponge) 900 deforms into the spaces as indicated by broken lines in the Figure. The recording head IJH includes an electrode layer 1302, a heat generating layer 1303, a top protection layer 1301, an orifice plate 400 and an ink supply pipe 2200.

The ink jet cartridge integrally comprises an ink accommodating container 1000 having an ink retaining porous material therein and also having an air vent and an ink dispensing port for supplying the ink outside the container, and an ink jet recording head having ejection energy generating means, an ink chamber for retaining the ink to be supplied to the ejection energy generating means, a supply pipe press-contacted to the porous material in the ink container to feed the ink to the ink chamber and a filter F provided at an end of the supply pipe.

In this embodiment, the supply pipe is pressed to the porous material by the degree which is larger than the maximum length of the cross section of the supply pipe. In this embodiment the supply pipe is in the form of a cylindrical pipe, and therefore, the degree of deformation of the porous material by the press-contact is larger than the inside diameter of the supply pipe. By doing so, the porous material 900 at which the filter F is press-contacted can provide a sufficiently pressed region to the entire surface of the filter. Therefore, it has been prevented that the air is first concentrated on a part of the filter F.

Conventionally, the degree of the deformation depth is determined only on the basis of the deformation of the porous material without regard to the maximum dimension of the cross-sectional area of the supply pipe 2200 (a major axis length in the case of oval cross-section, the length of the diagonal line in the case of polygon cross-section or a diameter in the case of circle). Therefore, the distribution over the entire surface of the filter is not considered. In this embodiment, even if the air in the form of bubbles enter the porous material 900 with the consumption of the ink, the ink is first supplied to the filter. Therefore, the good ink supply can be maintained without the concentration of the bubbles around the filter. This structure is particularly effective when the ribs 270 and 2600 are not formed in the container, and is also effective to the case where the ribs ar smaller than the above-described maximum length.

With the structure wherein the air spaces 51 are positively provided, the improper recording occurrence preventing effect is in some case inferior to the conventional structure. This is considered as being because the entering of the air can not be completely predicted or because the ink existing region without the porous material 900 changes. The inventors have investigated the problems and have provided a solution. The porous material is generally rectangular parallelepiped. A cavity is provided inside the air vent. On a top plan view of the ink container a circle is drawn with a center coincident with the end of the supply pipe pushed against the porous material and with a radius between the center and a closest position of said cavity on the top plan view. The ribs are provided on the side (vertical) inner surfaces of the container, outside the circle. The depth Z of the supply pipe immersed satisfies $$2 \times H2 \leqq Z \leqq 3 \times H2$$

where H2 is the height of the ribs 2600 in FIG. 1.

By doing so, even if the ink concentrated area, the boundary N of the central portion M is moved to the position indicated by "m", the ink can be first supplied to the filter to the central portion M. The preferable numerical range, considering the space forming condition, is such that the maximum length of the ribs H2 is not more than 3 mm, and the depth of deformation Z is not less than 6 mm and not more than 9 mm.

In this embodiment, the flow resistance of the ink in the region where the porous material is contacted to the inside wall of the ink container is considered. As contrasted to the tendency for increasing the ink content, the inventors have formed that the non-contact area between the absorbing material and the inner surface of the container is preferably not less than 15% of the total inner surface.

By doing so, the ink flow resistance can be reduced, and the ink can be supplied without influence by the ejection frequencies.

The further improvement will be described which has been accomplished by considering the change of the configuration of the porous material between before and after the loading into the ink container.

Further, it has been found preferable that the depth Z of the immersed portion of the supply pipe satisfies:

$$Z \geqq (W0-W1)+H2+D$$

wherein (W0−W1) is a difference of the dimension shown in FIG. 1 between before and after the porous material is intended into the container, D is a maximum size of the cross-section of the supply pipe described hereinbefore, and H2 is the height of the ribs. The same as described hereinbefore as regards the height applies to H2 when the ribs have different sizes.

In this embodiment, the height H1 of the ribs 270 and the height H2 of the ribs 2600 are the same. If they are different, the above inequation is discriminated on the basis of the larger one. However, the structure satisfying the inequation on the basis of the smaller one, the results were still better. In this case, the depth of deformation of the porous material is measured in the direction of the supply pipe 220 inserted.

In FIG. 1, distance D1 from a side surface in the detection of the insertion of the supply pipe is not limiting, but is preferably equivalent to the rib or not less than 2 mm, when the rib is provided. The distances D1, D3 and D4 from the inside walls of the container are preferably approximately 1.5 times the height of the ribs. It is preferable that the end of the supply pipe is within this range. By doing so, the neighborhood of the porous material adjacent to the supply pipe end where the pressure is made uniform, rather than the stabilized region M, assuredly supplies the ink to the recording head.

Figure 12A:
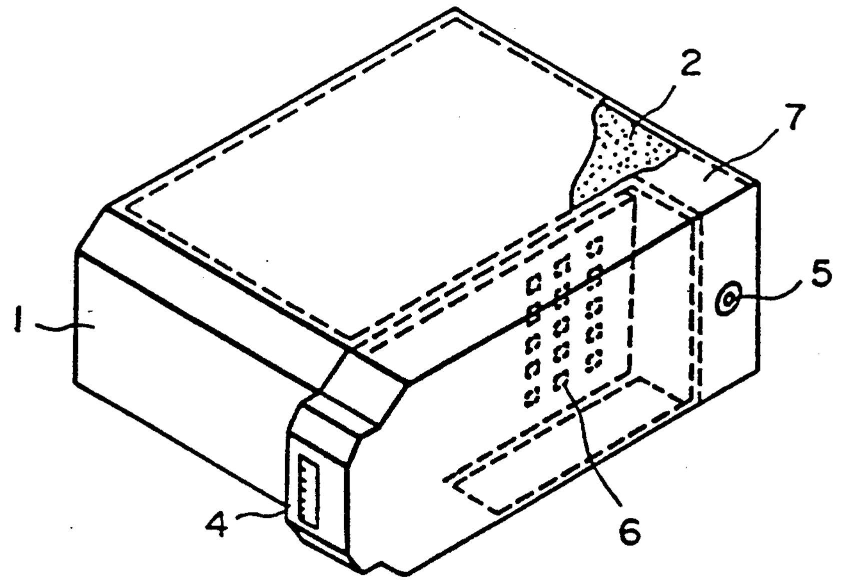
FIGS. 12A, 12B, 12C, 12D, 12E and 12F illustrate further embodiments.
Figure 12B:
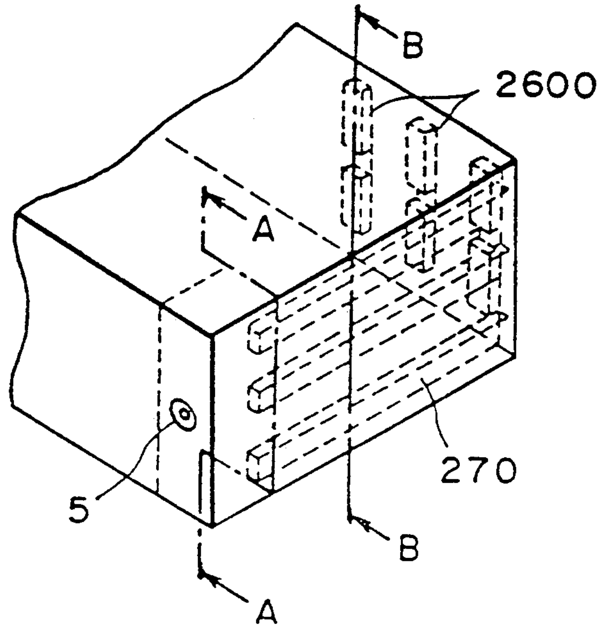
Figure 12C:
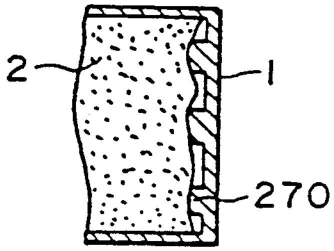
Figure 12D:
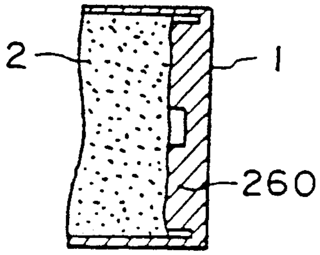
Figure 12E:
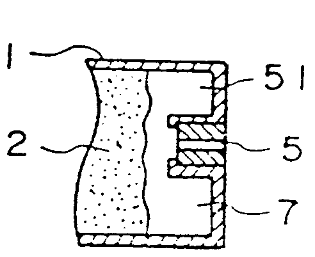
Figure 12F:
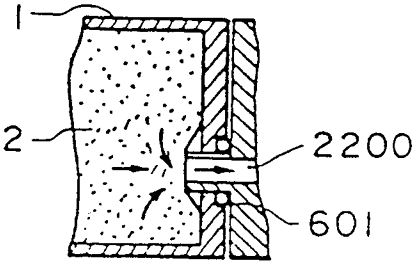

It is preferable that the porous material in the region adjacent to the end of the supply pipe is connected to the stabilized region M. In the embodiment of FIG. 12, similarly to the foregoing embodiment, the ribs 260 and 270 are provided on the internal wall of the ink container 1 to provide a space communicating with the ambience. However, the configuration is different. In this embodiment, the porous material 2 in the ink container 1 is out of contact at the area which is not less than 15% of the total surface area in the ink container, by which the formed non-contact spaces communicate with the ambience. The ribs 2600 and 270 ar integrally formed with the ink container. Therefore, the ink can be stably supplied without influence by the frequency of ejection, by the reduction of the flow resistance. By the provision of the ribs as shown in FIG. 12B (cross-sections along A—A and B—B), the porous material is kept out of contact with the internal wall of the ink container, so that the space or spaces communicating with the ambience can be assured. As shown in the cross-section B—B, when the ribs are formed as if they would block the flow of the air, due to the convenience of the molding, the ribs are provided with grooves so as to prevent the space from being closed by the absorbing material into an independent space. The width and depth of the grooves is selected in accordance with the mechanical property of the absorbing material. As shown in FIG. 12E, in this embodiment, the rear space of the head 4 (approximately 3%) contains the absorbing material 2, as in the conventional structure, but as a whole, more than 15% of the inside surface area of the ink container is out of contact with the absorbing material 2, and therefore the above-described effects can be provided.

Figure 11A:
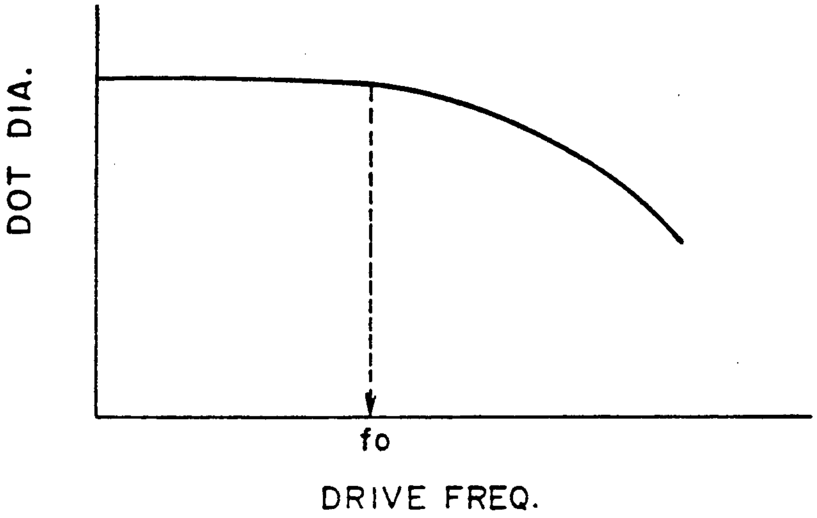
FIGS. 11A and 11B show ejection properties.
Figure 11B:
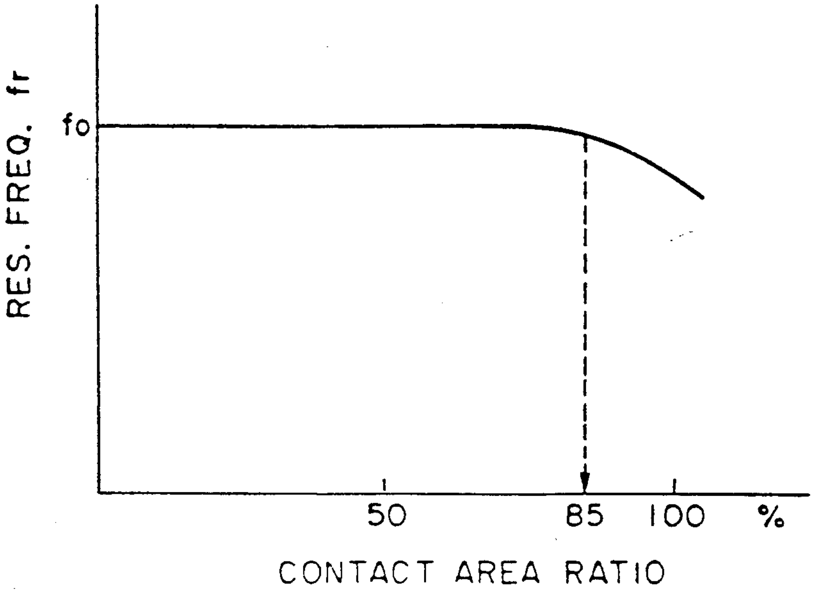

FIG. 11 shows the ejection properties in this case. If the non-contact area is 3%, the usable frequency decreases. By the reduction of the frequency, the amount of ejection extremely decreases with the result of degraded print quality (FIG. 11A). Upon high duty required, the ejection does not follow properly with the result of ejection failure in some cases. However, by increasing the area open to the ambience, the flow of the ink in the absorbing material is made easier. As shown in FIG. 11B, if it is not less than 15%, the adverse affect to the ejection can be prevented. The position of the non-contact area is not limiting. Therefore, the above-described structure can be provided at the side surfaces, top surface and bottom surface, so as to communicate with the air vent port so as to assure the area open to the ambience. The area not less than 15% communicating with the ambience is preferably employed in the structure described in conjunction with FIGS. 1-6.

FIGS. 7-10 show other embodiments.

Figure 8:
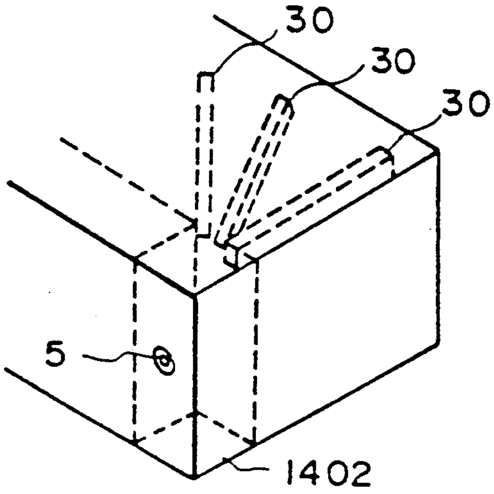
FIGS. 8, 9 and 10 are perspective views of the device according to further embodiments of the present invention.

In FIG. 8, radial ribs 30 are formed on the top inside surface of the ink container from the air vent. With this structure, the ratio of the air existing at the central region and the marginal region of a large absorbing material can be adjusted.

Figure 9:
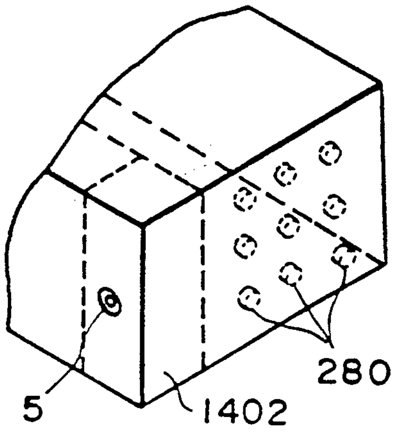

In FIG. 9 embodiment, columnar projections are provided.

Figure 10A:
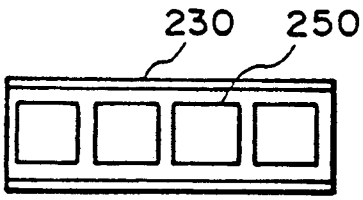
Figure 10B:
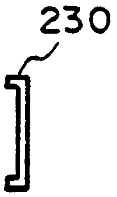
Figure 10C:
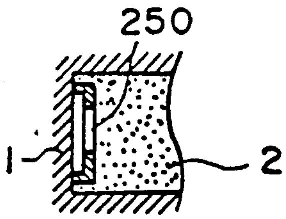

In FIG. 10, parts having channel-like configuration are bonded to the inside surface of the container. By doing so, the non-contact area can be increased.

Figure 7A:
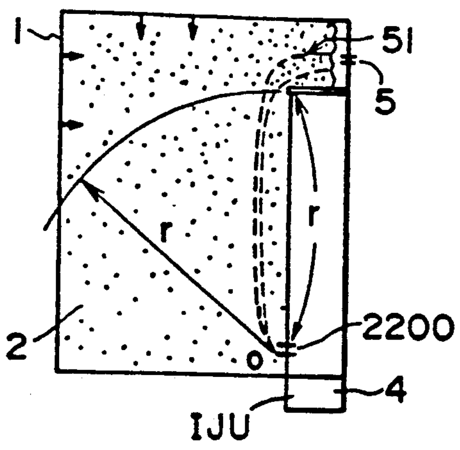
FIG. 7 illustrates flow of the ink.
Figure 7B:
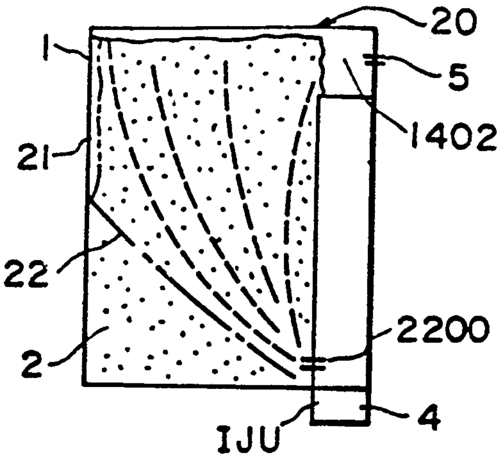
Figure 7C:
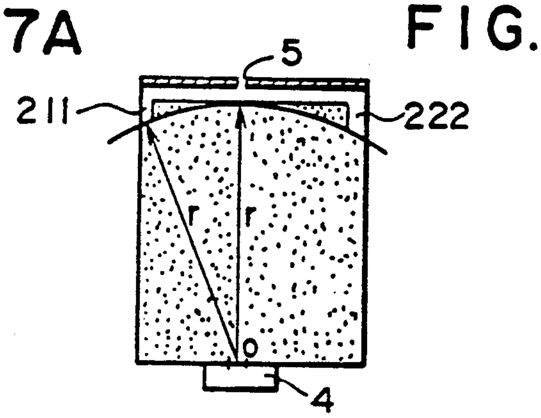

In FIG. 7A, it will be understood that if the absorbing material provides very limited communication with the ambience, the air passage is constituted immediately after the start of the use, through the minimum distance toward the ink supply pipe 220, and therefore, most of the ink retained in the absorbing material is not consumable. FIGS. 7B and 7C illustrates the formation of the air passage. As described in the foregoing, utilizing the rear space required for unifying the ink jet head and the ink container, a projection for the air vent is formed. The inside of the projection constitutes a cavity functioning as an atmospheric pressure supplying space or cavity 1402 for the entire thickness of the porous material. As compared with the case of FIG. 7A, the cavity 1402 is effective to make uniform the ink supply in the thickness direction. In addition, the atmospheric pressure supply space or cavity 20 at the rear of the head 4, is effective to disperse the air expansion as far as the corner portions remote from the supply pipe, so that the ink most remote from the supply pipe can be consumed. In addition, when the region 21 outside the region defined by the minimum distance r between the supply region and the region communicating with the ambience is communicating with the ambience, the ink supply (air expanding) route 22 can be formed, and therefore, the ink retained in the porous material 2 can be assuredly supplied to the head 4.

In FIG. 7C, the ink supply region and the air supply region are disposed in the opposed relation, and therefore, the outside region is adjacent the lateral sides 211 and 222, and therefore, the regions 211 and 222 are made communicating with the ambience.

Figure 13:
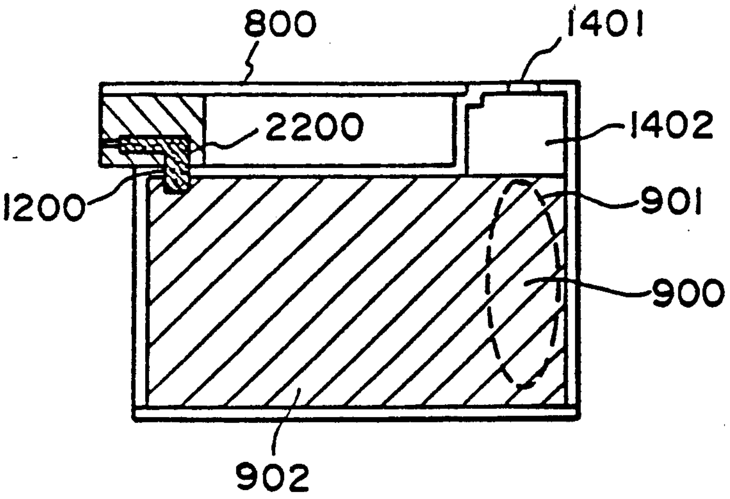
FIG. 13 shows a further embodiment.

FIG. 13 shows a sectional view of a liquid jet recording head, wherein the inside pressure of the ink container is reduced, and the ink is filled totally through the supply port 1200. Then, the ink is completely filled in the porous material 902. Next, a discharge port 1401 is opened with the supply port closed, and the excessive ink over a predetermined amount of ink is taken out through the discharge port (air vent). By doing so, at the supply port side, the ink remains as long as the porous material can retain it. The discharge port 1401 side ink is first removed. The region is indicated by reference numeral 901 By doing so, the ink can be distributed more at the supply port side.

Figure 14:
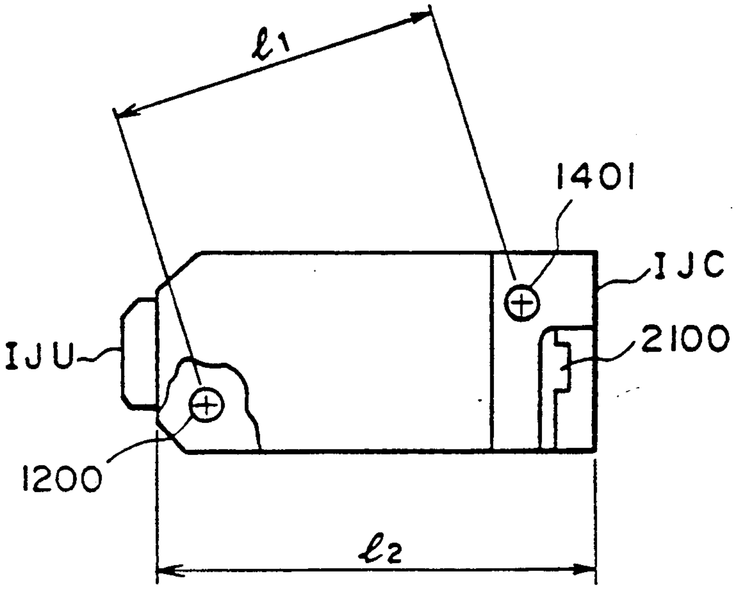
FIG. 14 illustrates a further embodiment.

FIG. 14 is a side view of a liquid jet recording head, wherein the distance between the supply port 1200 and the discharge port 1401 is as large as possible in the recording head. The inventors' experiments have revealed that $$l_1 l_2 \geqq 0.7$$

is preferable.

If this is satisfied, the ink adjacent to the supply port 1200 is not removed, so that the ink remains adjacent the supply port. Then, the quantity of ink which can be supplied to the recording head increases. Alternatively, the ink may be supplied through the ejection outlets back into the container with the discharge part 1401 opened. Then, the similar distribution of the ink can be provided.

According to this embodiment, the percentage of the consumable ink is approximately 80% of the injected ink, so that the number of prints provided by the same dimension recording head is increased. If the number of prints is the same, the size of the ink jet recording head can be reduced.

The present invention is particularly suitably usable in a bubble jet recording head and recording apparatus developed by Canon Kabushiki Kaisha, Japan. This is because, the high density of the picture element, and the high resolution of the recording are possible.

The typical structure and the operational principle are preferably those disclosed in U.S. Pat. Nos. 4,723,129 and 4,740,796. The principle is applicable to a so-called on-demand type recording system and a continuous type recording system. Particularly however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and a plural recording heads combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefor, pressing or suction means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single heads corresponding to a single color ink, or may be plural heads corresponding to the plurality of ink materials having different recording colors or densities. The present invention is effectively applicable to an apparatus having at least one of a monochromatic mode mainly with black and a multicolor mode with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material is solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material The present invention is applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

As described in the foregoing, according to an aspect of the present invention, not less than 15% of the inside surface area of the ink container communicates with the ambience. Then, good ink ejection property can be assured without decrease of the response frequency.

According to another aspect of the present invention, the inner side surfaces of the container remote from the end of the supply pipe by a distance larger than the minimum distance between a cavity adjacent the air vent opening and the end of the supply pipe, is provided with ribs to provide adjacent them non-contact portion between the inner surface of the container and the porous material. The ink can be consumed efficiently.

According to a further aspect of the present invention, the ink in the ink container can be efficiently consumed.

According to a further aspect of the present invention, the improved method of ink filling can be provided.

While the invention has been described with reference to the structures disclosed herein, it is not confined to the details set forth and this application is intended to cover such modifications or changes as may come within the purposes of the improvements or the scope of the following claims.

What is claimed is:

1. A process of filling an ink container having a porous material with ink, said process comprising the steps of:

providing an ink container having a porous material therein;

supplying ink in a quantity greater than that which the porous material can retain by directing the ink into the ink container through a supply port connectable to a recording head; and after said supplying step, closing the supply port and removing from the ink container through a port different from the supply port at least a quantity of ink which the porous material cannot retain when the supply port is closed.

2. A process according to claim 1, wherein said ink container has at least 15% of non-contact area between the porous material and an inside surface of the ink container.

3. A process according to claim 1, wherein the port different from the supply port comprises an air vent.

4. A process for filling with ink an ink container having a porous material, said process comprising the steps of:

providing an ink container having a porous material therein;

supplying ink in a quantity greater than that which the porous material can retain by directing the ink into the ink container through a supply port connectable to a liquid jet recording head; and closing the supply port and removing ink from the ink container through a port different from the supply port to keep a quantity of ink retainable by the porous material at a liquid jet recording head side of the ink container when the supply port is closed.

* * * * *

UNITED STATES PATENT AND TRADEMARK OFFICE
CERTIFICATE OF CORRECTION

PATENT NO. : 5,280,299

DATED : January 18, 1994

INVENTOR(S) : HIDEO SAIKAWA, ET AL.

It is certified that error appears in the above-identified patent and that said Letters Patent is hereby corrected as shown below:

ON TITLE PAGE

In [30] Foreign Application Priority Data:
"Feb. 28, 1990 [JP] Japan .......... 1-048177" should read
--Feb. 28, 1990 [JP] Japan .......... 2-048177--.

In [57] Abstract, Line 1, "include" should read --includes--.

COLUMN 1

Line 39, "pipe" should read --pipe is--.
Line 40, "supplies" should read --supplies ink--.

COLUMN 2

Line 53, "heat IJH," should read --head IJH,--.

COLUMN 3

Line 41, "ha" should read --has--.

COLUMN 4

Line 26, "ma" should read --may--.
Line 68, "to" should be deleted.

COLUMN 5

Line 18, "1400" should be deleted.
Line 34, "constituting" should read --constitute--.

UNITED STATES PATENT AND TRADEMARK OFFICE
CERTIFICATE OF CORRECTION

PATENT NO. : 5,280,299

DATED : January 18, 1994

INVENTOR(S) : HIDEO SAIKAWA, ET AL.

It is certified that error appears in the above-identified patent and that said Letters Patent is hereby corrected as shown below:

COLUMN 6

Line 16, "the" (first occurrence) should be deleted.
Line 66, "take" should read --takes--.

COLUMN 7

Line 6, "o the" should read --on the--.
Line 24, "whole 320" should read --hole 320--.
Line 60, "combined" should read --combined with--.

COLUMN 9

Line 20, "of a" should read --of--.

COLUMN 10

Line 30, "enter" should read --enters--.
Line 36, "ar" should read --are--.

COLUMN 11

Line 56, "ar" should read --are--.

COLUMN 12

Line 36, "In" should read --In the--.
Line 47, "illustrates" should read --illustrate--.

COLUMN 13

Line 16, "numeral 901" should read --numeral 901.--.
Line 24, "$l_1 l_2 \geqq 0.7$" should read --$l_1/l_2 \geqq 0.7$--.

--

UNITED STATES PATENT AND TRADEMARK OFFICE
CERTIFICATE OF CORRECTION

PATENT NO. : 5,280,299

DATED : January 18, 1994

INVENTOR(S) : HIDEO SAIKAWA, ET AL.

It is certified that error appears in the above-identified patent and that said Letters Patent is hereby corrected as shown below:

COLUMN 14

Line 26, "a" should be deleted.
Line 47, "heads" should read --head--.

COLUMN 15

Line 8, "material" should read --material.--.

Signed and Sealed this

Thirtieth Day of August, 1994

Attest:

BRUCE LEHMAN

Attesting Officer

Commissioner of Patents and Trademarks